Figure 1:
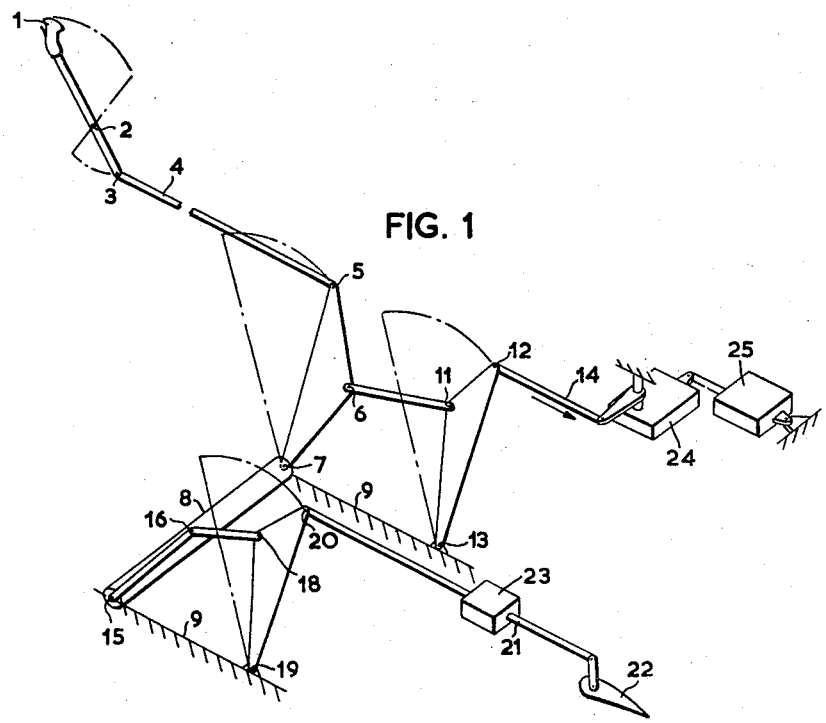

Jan. 28, 1964 J. C. GIBSON 3,119,583
LINKAGE IN AIRCRAFT POWER CONTROL SYSTEMS
Filed Jan. 3, 1961 3 Sheets-Sheet 1

INVENTOR
John Campbell Gibson
BY
Stevens, Davis, Miller + Mosher
ATTORNEYS

Jan. 28, 1964  J. C. GIBSON  3,119,583
LINKAGE IN AIRCRAFT POWER CONTROL SYSTEMS
Filed Jan. 3, 1961  3 Sheets-Sheet 2

INVENTOR:
JOHN CAMPBELL GIBSON

By: Stevens, Davis, Miller + Mosher
Attorneys

United States Patent Office 3,119,583
Patented Jan. 28, 1964

3,119,583
LINKAGE IN AIRCRAFT POWER CONTROL SYSTEMS
John Campbell Gibson, Lytham St. Annes, England, assignor to The English Electric Company Limited, London, England, a British company
Filed Jan. 3, 1961, Ser. No. 80,108
Claims priority application Great Britain Jan. 15, 1960
5 Claims. (Cl. 244—83)

The present invention relates to an aircraft control system having an artificial feel unit.

A feature of high performance aircraft is the wide variation in tailplane effectiveness in different flight conditions. This may be as much as 15:1 between high subsonic speeds at low altitude, on the one hand, and moderate supersonic speeds at high altitude or when landing, on the other hand. Owing to very small stick displacements per $g$ in the first case and very large ones in the second, the pilot may experience difficulty with control oversensitivity and undersensitivity, respectively. In addition, a large overall travel has to be provided for the tailplane to allow adequate supersonic high altitude manoeuvrability, so that the total stick travel, usually limited, has to cover a greater tailplane range than may have been customary in the past, thus aggravating any oversensitivity problem.

To overcome this it is possible in one system to vary the gearing between the stick and the tailplane according to the flight condition so that for the same total stick displacement varying amounts of tailplane displacement are available. This method has the disadvantage of introducing complications in the form of a gearing mechanism, which must not permit backlash, a computer, and the necessary safeguards against failure. In another system the stick has a fixed neutral position, trimming being effected by an extensible link in the control circuit. A non-linear linkage then provides relative to linear linkage increased stick displacements for small tailplane movements as required for manoeuvre from the trimmed neutral, thus enabling a larger stick displacement for a given effectiveness of tailplane control at the higher subsonic speeds than could be obtained with a linear linkage. A disadvantage of this system is that the rapidly changing gearing for even moderately small displacements makes precise control more difficult, and may also introduce undesirable steady state- and dynamic control force-characteristics. Neither system allows the pilot to derive information about the tailplane position directly from the stick, as is often held to be desirable.

The system according to the invention overcomes the above disadvantages, and is simple, effective and reliable. It is applicable to aircraft with an "all-moving" tailplane actuated by a power-operated control system, which is the arrangement almost universally used on this class of aircraft.

In the aircraft control system according to the invention every position of the pilot's control stick corresponds to a definite position of the tailplane, so that the pilot may derive information about the tailplane position directly from the position of the stick. For any flight condition the "neutral" position of the stick, at which the stick force from an artificial feel unit is adjusted to zero, it matches the corresponding tailplane angle adjusted to trim the aircraft for the actual flight condition. As is well known, this trim angle is different for subsonic and supersonic flight conditions. A non-linear linkage varies the stick to tailplane gearing ratio from a minimum value to a maximum as the stick is moved from fully back to fully forward. Also the neutral stick position for high subsonic speeds at low altitude will be substantially fully forward when the tailplane is in trim and will be substantially fully back at moderate supersonic speeds at high altitude or when landing. In actual flight at any one condition of flight the amount the tailplane or stick can be moved on either side of the neutral position to manoeuvre the aircraft within its designed stressing limits is in general fairly small in relation to its whole travel and the gearing ratio is varied without any deliberate action on the part of the pilot or control means other than the inherent changing of the tailplane trim angles in different flight conditions, and because the stick/tailplane movement ratio of the gearing between these components varies with tailplane position and therefore with trim angle, the characteristics of tailplane effectiveness and tailplane trim angle are such that an appropriate control sensitivity results for any flight condition. Furthermore, within the aircraft strength or stalling incidence limits, as will be described later in more detail, the non-linearity of stick displacement per $g$ is negligible in most cases, provided that the linkage is not excessively non-linear. It is not possible to provide constant stick displacement per $g$ over all flight conditions, which is sometimes postulated as the ideal, together with constant stick force per $g$; because only a small part of the total stick travel is used for any manoeuvre, the non-linearity of the stick displacement is relatively small. However the gearing ratio is thus automatically selected by the tailplane trim angle, and the characteristics of tailplane effectiveness and tailplane trim angle are such that an appropriate control sensitivity results for any flight condition. Furthermore, within the aircraft strength or stalling incidence limits, the non-linearity of stick displacement per $g$ is negligible in most cases, provided that the linkage is not excessively non-linear. It is not possible to provide constant stick displacement per $g$ over all flight conditions, which is sometimes postulated as the ideal together with constant stick force per $g$. However, within the limits of over and undersensitivity a wide variation in stick displacement per $g$ is tolerated and stick force is the parameter of major importance.

The stick force per $g$ at any one flight condition resulting from an artificial feel unit would be nearly linear, as the stick displacement per $g$ are nearly so. However, if a conventional $q$ feel unit is used, i.e. a system responsive to air density and to the square of the true airspeed, stick forces per $g$ at different flight conditions will differ, which is undesirable.

When using such a feel unit incorporated into the control system with a non-linear ratio between stick and tailplane movements, correct stick forces can be attained at practically all flight conditions by using a second non-linear linkage between the artificial feel unit and the stick, in addition to the first non-linear linkage between stick and tailplane.

The said non-linear linkages may for example be formed by articulated quadrilaterals each having two equal arms articulated to the aircraft structure as a fixed base and connected at their free ends by a link. The degree of non-linearity of such a linkage may be selected for a given aircraft by selecting the length of said link: if this length approaches the length of the said base, the linkage approaches linearity, while non-linearity increases with the difference of its length from that of the base.

The input arms of the said two quadrilaterals are fixedly coupled to one another, say by a transverse lay shaft, and they are articulated by any conventional connection means to the pilot's control stick. The output arm of one of said quadrilaterals is articulated by any conventional means to an artificial feel unit, for example $q$-feel unit and the output arm of the other quadlilateral is likewise articulated to the tailplane.

Figure 2:
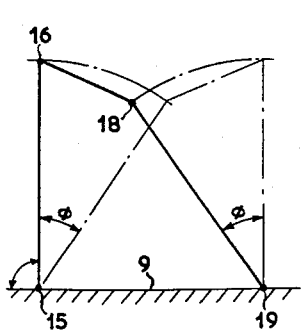
Figure 3:
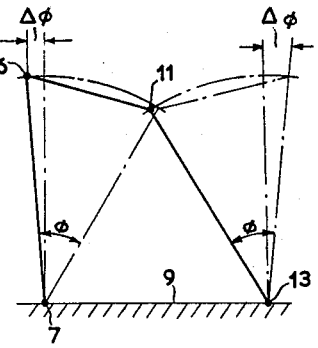
Figure 4:
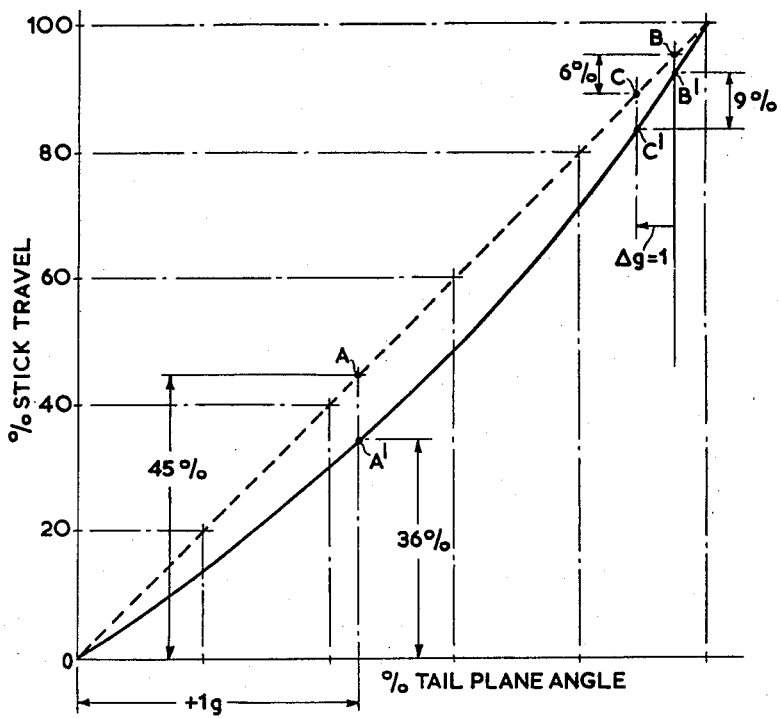
Figure 7:
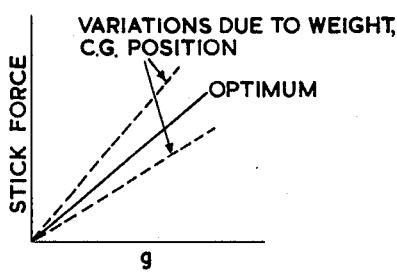
Figure 8:
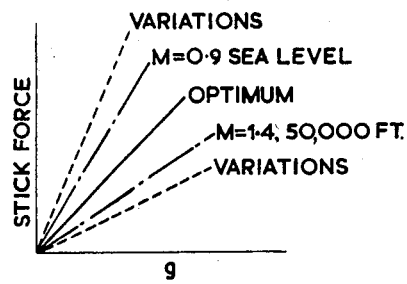
Figure 9:
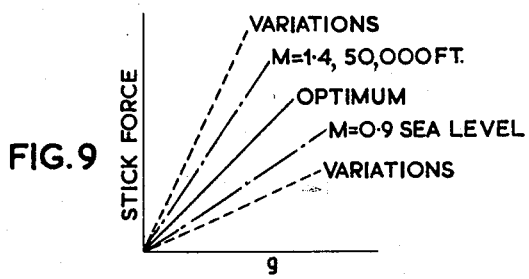
Figure 5:
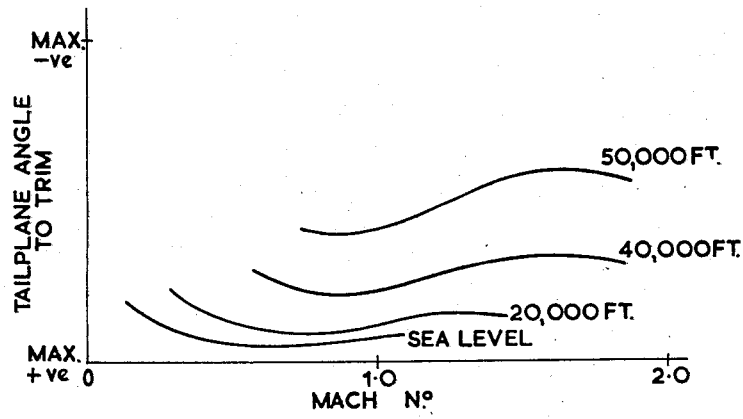
Figure 6:
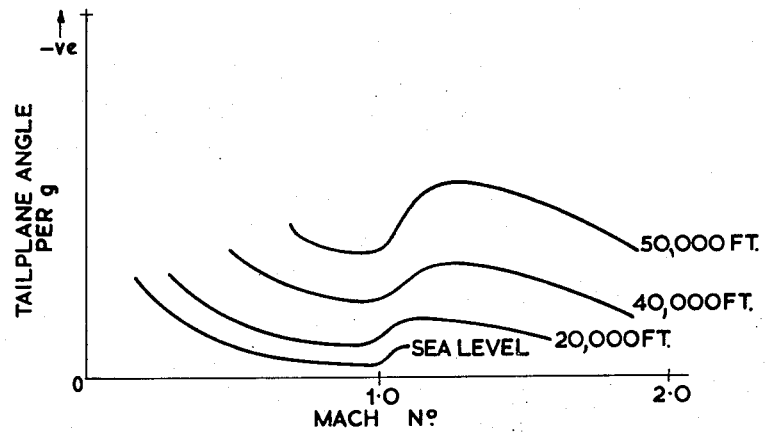

In order that the invention may be clearly understood, an embodiment thereof will now be described by way of example with reference to the accompanying drawings, in which:

FIG. 1 is a diagrammatic perspective general arrangement of the double non-linear linkage according to the invention, FIGS. 2 and 3 are diagrammatic side elevations of the two articulated quadrilaterals forming the two non-linear linkages, on a larger scale, FIG. 4 is a graph plotting the percentage of stick travel against percentage of tailplane angle for linear linkage (straight dotted line) and for non-linear linkage (full line curve) the stick travel percentages for an increment of 1 g being indicated for the oversensitivity range and for the undersensitivity range, respectively, FIG. 5 is a graph plotting against Mach number the tailplane angle required to trim a typical supersonic aircraft, i.e. to hold it in steady, level, 1 g-flight, for various altitudes, FIG. 6 is a graph plotting against Mach number the tailplane angle, additional to the trim angle according to FIG. 5 required to produce a normal acceleration increment of 1 g, for the same aircraft, for various altitudes, FIG. 7 shows stick forces plotted against g for linear linkage between control stick, feel unit, and tailplane, FIG. 8 corresponds to FIG. 7, but with a non-linear linkage between control stick and tailplane, and FIG. 9 corresponds to FIG. 7, but with a non-linear linkage interposed between the feel unit and the pilot's control stick.

Referring firstly to FIGS. 1-3, the pilot's control stick 1 is pivotally mounted at 2 on the aircraft structure, and articulated at 3 by diagrammatically indicated conventional means 4 to a first non-linear linkage at 5. This linkage consists of two arms 6—7 and 13—11 of equal length pivotally attached at 7 and 13, respectively, to the aircraft structure 9, the fixed base of an articulated quadrilateral 7—6—11—13, and articulated to one another at their free ends by a link 6—11 which is shorter than the distance between the joints 7—13, and the length of which may be selected in order to establish the desired degree of the non-linearity of the linkage.

An artificial feel unit 24 is articulated at 12 to the arm 13—11 by conventional means indicated diagrammatically at 14, and a conventional trim adjuster 25 may also be provided.

A second non-linear linkage is likewise an articulated quadrilateral, which has its base 15—19 on the aircraft structure 9, two arms 15—16 and 19—18 of equal length articulated to said base, and at their free ends to one another by a link 16—18 shorter than the base 15—19. By conventional means indicated diagrammatically at 21 the arm 19—18 is articulated at 20 to an aerodynamic control surface 22 (e.g. all-moving tailplane). A conventional power jack 23 may be provided, for example, in the linkage 21 to said aerodynamic control surface 22.

The two non-linear linkages are connected to one another by a transverse lay shaft 8 connecting the two arms 7—6 and 15—16 with one another.

It will be seen that the non-linear linkage 7—6—11—13 is interposed between the pilot's control stick 1 and the artificial feel unit, and the other non-linear linkage, namely the articulated quadrilateral 15—16—18—19 is arranged between the pilot's control stick 1 and the aerodynamic control surface 22. A conventional power jack may be provided for example in the linkage 21 to said aerodynamic control surface 22.

From FIG. 2 it will be seen that the quadrilateral 15—16—18—19 moves between two end positions in which the arm 15—16 is perpendicular to the base 15—19 and the arm 19—18 includes an angle $\phi$ with the perpendicular to 15—19, and in which the arm 19—18 stands perpendicular, and the arm 15—16 includes an angle $\phi$.

From FIG. 3 it will be seen that the quadrilateral 7—6—11—13, which is coupled to the other quadrilateral by the lay shaft 8 (FIG. 1) has an angular offset $\Delta\phi$ from the perpendicular to the base 7—13 at these end positions, owing to the fact that the link 6—11 exceeds in length the link 16—18 of the quadrilateral 15—16—18—19. By selecting the length of the link 16—18 this angular offset may be selected at will.

Referring now to FIG. 4 the dotted straight line shows the linear relationship between stick travel and tailplane angle, i.e. the line passes through the origin in FIG. 4 at a constant slope.

The non-linear linkage between the pilot's stick and the tailplane produces the full line graph starting at the origin of FIG. 4 with a smaller slope and joining the 100% point at a steeper slope than the straight line.

FIG. 5 plots against Mach number the tailplane angle required to trim a typical supersonic aircraft to hold it in steady, level, 1 g-flight, for flight at sea level, 20,000 ft., 40,000 ft., and 50,000 ft.

FIG. 6 plots against Mach number the tailplane angle additional to the said trim angle required to produce a normal acceleration increment of 1 g on the same aircraft, for flight at the same altitudes as in FIG. 5.

It will be seen from FIG. 6 that at high subsonic speed at sea level the smallest variation in tailplane angle is required for a certain increment in g, that in this flight condition the stick is trimmed nearly fully forward. It is therefore in this flight condition where oversensitivity of control may occur, which can be dangerous in overstressing the aircraft or in loss of control.

Conversely at moderate supersonic speed at high altitude maximum variation in tailplane angle is required for a certain increment in g (FIG. 6). In this flight condition accordingly undersensitivity may occur, which is not dangerous but may be objectionable to the pilot in that it requires excessive movements of the control stick.

Referring now again to FIG. 4, the ordinates of point A on the dotted straight line, and of the corresponding point A¹ on the full line curve mark for a flight condition at the moderate supersonic speed of $M=1.4$ and the high altitude of 50,000 ft. the percentage stick travel required for an increment of 1 g: with linear gearing this would amount to about 45% stick travel (point A), while with the said non-linear gearing this percentage is reduced to about 36% (point A¹), involving a considerable saving in stick travel.

Conversely at the high subsonic speed of $M=0.9$ at sea level for an increment of 1 g the stick travel would be expressed by the difference in the ordinates of points B and C on the straight dotted lines without non-linear gearing, which is about 6% of the stick travel, and by the difference in the ordinates of points B¹ and C¹ on the full line curve, which is about 9%, increasing the stick travel one and a half times, and reducing oversensitivity accordingly.

The introduction of non-linearity into the gearing between the pilot's control stick and the tailplane is accordingly of a greatly beneficial effect as regards stick travel, both in the range of oversensitivity and undersensitivity.

However the effect of non-linear gearing on stick forces has also to be investigated.

FIG. 7 plots the stick force against g for an aircraft having an artificial q-feel system, i.e. a feel system responsive to the air density and to the square of true air speed. It will be seen that the stick force is directly proportional to the increment in g produced by the stick. The full line in FIG. 7 shows the optimum relation between stick force and g, which is however subject to variations due to changes in weight or of centre of gravity position of the aircraft, as indicated in the two dotted lines.

By introducing a non-linear linkage between the stick and tailplane or a non-linear linkage between stick and feel unit, the conditions of FIG. 7 are changed as shown in FIG. 8, where the non-linear linkage is arranged between the artificial feel unit and the tailplane, and in FIG. 9, where the non-linear linkage is arranged between the artificial feel unit and the pilot's control stick.

Considering that the gearing does not change the tailplane angle per increment in $g$, it is clear that in the oversensitivity range at high subsonic Mach numbers at sea level with the arrangement corresponding to FIG. 8 greater stick forces have to be applied in order to overcome the artifical resistance offered by the $q$-feel unit in order to perform the required tailplane deflection than the optimum attained with a linear gearing, and conversely lower stick forces are required than the optimum in the range of undersensitivity at a moderate supersonic Mach number and high altitude, these two conditions being shown in FIG. 8 in chain-dotted lines.

Conversely, the effect of a non-linear linkage in an arrangement corresponding to FIG. 9 would be a reduction of stick forces below optimum in the oversensitivity range, and an increase thereof in the undersensitivtiy range, as likewise shown in chain-dotted lines in FIG. 9.

Considering the effects of variations in stick forces due to changes in weight or in centre of gravity positions, as described with reference to FIG. 7, their superposition upon the effects of a single non-linear gearing corresponding to either FIG. 8 or FIG. 9 may lead to unacceptable stick forces as indicated in dotted lines in FIGS. 8 and 9.

By connecting the pilot's stick to the artificial feel unit by one non-linear linkage and the pilot's stick to the tailplane by another non-linear linkage as diagrammatically indicated in FIG. 1 their effects on stick forces described with reference to FIGS. 8 and 9 compensate one another at least partly, so that the conditions of FIG. 7 are at least approximately restored.

By this preferred arrangement accordingly the favorable effect of non-linear linkage on stick travel in the oversensitivity and undersensitivity ranges is attained without adverse effect on stick forces.

The main features of the non-linear linkage system according to the invention are thus as follows:

(1) The appropriate control sensitivity for any flight condition is varied without any deliberate action on the part of the pilot or control means other than the inherent aerodynamic characteristics of changing the tailplane trim angles in different flight conditions of the aircraft, since the stick-tailplane movement ratio depends on the tailplane position, and the said control sensitivity is arranged to be an optimum at the tailplane positions to trim for different flight conditions.

(2) The mechanism is of the simplest possible form and is correspondingly proof against failure.

(3) Non-linear and varying stick forces per $g$ with varying $g$ factor or varying flight conditions are avoided.

What I claim as my invention and desire to secure by Letters Patent is:

1. A power-operated control unit of an aircraft comprising in combination: a pilot's control stick, an artificial feel unit, an aircraft attitude control means, a first non-linear linkage linking said pilot's control stick to said artificial feel unit, and a second non-linear linkage linking said pilot's control stick to said aircraft attitude control means, said two non-linear linkages having substantially equal mechanical advantage.

2. A power-operated control unit as claimed in claim 1, wherein the said non-linear linkages are formed by articulated quadrilaterals having a fixed base on the aircraft and two arms linked at their one ends to said fixed base and a link linking the other ends of said arms, said link being of a length different from said base.

3. A power-operated control unit as claimed in claim 2, wherein the said base and arms of said two articulated quadrilaterals are of equal length, respectively and said links are of unequal length.

4. A power-operated control unit as claimed in claim 3, wherein the length of the link of quadrilateral linking said pilot's control stick to said artificial feel unit is longer than the link of the quadrilateral linking said pilot's control stick to said aircraft attitude control means.

5. A power-operated control unit as claimed in claim 3, wherein the first arm of each of said quadrilaterals is connected to said pilot's control stick and the other arm thereof is connected to said artificial feel unit and said aircraft attitude control means, respectively.

References Cited in the file of this patent

UNITED STATES PATENTS

| | | |
|---|---|---|
| 2,881,993 | Browne | Apr. 14, 1959 |
| 2,940,696 | Teague | June 14, 1960 |
| 2,940,697 | Lawrence | June 14, 1960 |
| 3,067,970 | Divola et al. | Dec. 11, 1962 |

FOREIGN PATENTS

| | | |
|---|---|---|
| 722,138 | Germany | July 2, 1942 |
| 742,383 | Great Britain | Dec. 30, 1955 |
| 1,150,433 | France | Aug. 12, 1957 |

OTHER REFERENCES

Machine Design, Nov. 27, 1958, vol. 30, No. 24, pages 119–123.